(12) United States Patent
Norman et al.

(10) Patent No.: US 6,320,732 B1
(45) Date of Patent: Nov. 20, 2001

(54) ELECTRICAL POWER DISTRIBUTION CONTROL SYSTEM WITH DUAL VOLTAGE SOURCES

(75) Inventors: Charles C. Norman, Brentwood; Todd M. Munyon, Nashville; Scott Jordan, Murfreesboro, all of TN (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/354,555

(22) Filed: Jul. 15, 1999

(51) Int. Cl.[7] .................... H02H 3/06; H02B 1/26
(52) U.S. Cl. ............... 361/62; 361/62; 361/622; 361/624; 361/627; 361/634; 307/18; 307/23; 307/42
(58) Field of Search .................. 307/43, 72, 64, 307/75, 147, 18, 23, 42; 361/62, 66, 622, 627, 641, 644, 648, 601, 602, 611, 624, 634, 636, 637, 646, 652, 655, 656; 700/286

(56) References Cited

U.S. PATENT DOCUMENTS 3,227,928 * 1/1966 Erickson ...................... 317/119
5,184,278 * 2/1993 Jordan et al. ................. 361/346
5,612,579 * 3/1997 Wisbey et al. ................. 307/18
5,705,862 * 1/1998 Lutz et al. .................... 307/148
5,892,449 * 4/1999 Reid et al. .................... 340/639

* cited by examiner

*Primary Examiner*—Josie Ballato
*Assistant Examiner*—Vaughn Marquis
(74) *Attorney, Agent, or Firm*—Kareem M. Irfan; Michael J. Femal; Larry I. Golden

(57) ABSTRACT

The present invention provides a power distribution system with a split section panelboard that provides two interior sections. Each section is supplied power from a separate power source. A common bus bridges the two sections. Remotely-operated circuit breakers for both the sections are connected to the common bus. A power interface unit converts power from one of the power sources to provide low voltage power for the circuit breaker motors and a control unit. The control unit in the panelboard controls the operation of the circuit breakers of both the sections.

19 Claims, 2 Drawing Sheets

ELECTRICAL POWER DISTRIBUTION CONTROL SYSTEM WITH DUAL VOLTAGE SOURCES

BACKGROUND OF THE INVENTION

1. Field of the Invention

This invention relates generally to electrical power distribution control systems and more particularly to a split bus panelboard system adapted for housing at least two sets of circuit breaker, each such set supplying power to their respective loads from a separate electrical power source.

2. Description of the Related Art

A separate power distribution panel (also referred to as "panelboard") is usually utilized to distribute power from each power line or source to the loads. Each such panelboard includes connections for multiple remotely-operated circuit breakers, each such circuit breaker supplying power to its associated load.

A power interface module in the power distribution panel utilizing the power entering the panelboard from the power lines provides low voltage power to the individual circuit breakers and to a control unit or circuit in the panelboard. The control unit controls the operation of the individual circuit breakers via a bus according to programmed instructions stored in the control unit and/or instructions provided thereto by a remote unit. In the event of a power failure, remote control of the circuit breakers becomes inoperable unless the power interface module receives power from an emergency power source or other auxiliary supply. When two separate power lines (usually at different voltages) are utilized to provide power for the various loads, two separate panelboards are used, each such panelboard having its own electronic circuitry. In the event of power outage of a particular voltage source, the associated electronics and the remotely-operated circuit breakers become inoperable.

Relay cabinet manufacturers provide cabinets wherein power is brought in from two separate power sources. The relays are connected downstream from the lighting panelboard circuit breaker and they control power to the loads. In addition, the electronics mounted in the relay cabinet controls the relays powered from different power sources. The individual relays, however, must be used in conjunction with upstream standard circuit breakers to accomplish the functionality provided by remotely-operated circuit breakers. For dual power source applications, especially emergency power applications, it would be advantageous to utilize a single panelboard and common electronic circuits or electronics to continuously provide power to at least two sets of remotely-operated circuit breakers wherein each such set controls power to the loads separate power source.

The present invention provides a split-bus panelboard which enables termination of two or more separate voltage sources in the panelboard and wherein a common power interface and control bus strip allows the control unit to utilize one of the power sources (usually an emergency generator) to continuously operate all of the remotely-operated circuit breakers, even during power outage of the other voltage source.

SUMMARY OF THE INVENTION

The present invention provides a power distribution system with a split section panelboard that provides two interior sections. Each section is supplied power from a separate power source. A common bus bridges the two sections. Remotely operated circuit breakers for both the sections are connected to the common bus. A power interface unit converts power from one of the power sources to provide low voltage power for the circuit breaker motors and a control unit. The control unit in the panelboard controls the operation of the circuit breakers in both of the split sections.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DETAILED DESCRIPTION OF THE PREFERRED EMBODIMENTS

Lighting control applications often include switching loads which are supplied power from two voltage sources, such as 480Y/227 vac and 208Y/120 Vac sources. The present invention provides a split bus panelboard wherein a main section of the interior of a split bus panelboard is supplied power from a first power source (generally the emergency power source) and the split or second section of the interior of the panelboard is supplied power from a separate second voltage source. Each section includes a number of remotely-operated circuit breakers which supply power to their respective loads. A common control bus bridges the main and split sections to operate circuit breakers from either voltage source. A common power interface module provides low voltages to the circuit breaker motors and a control unit, which control unit controls the operation of the circuit breakers.

Figure 1:
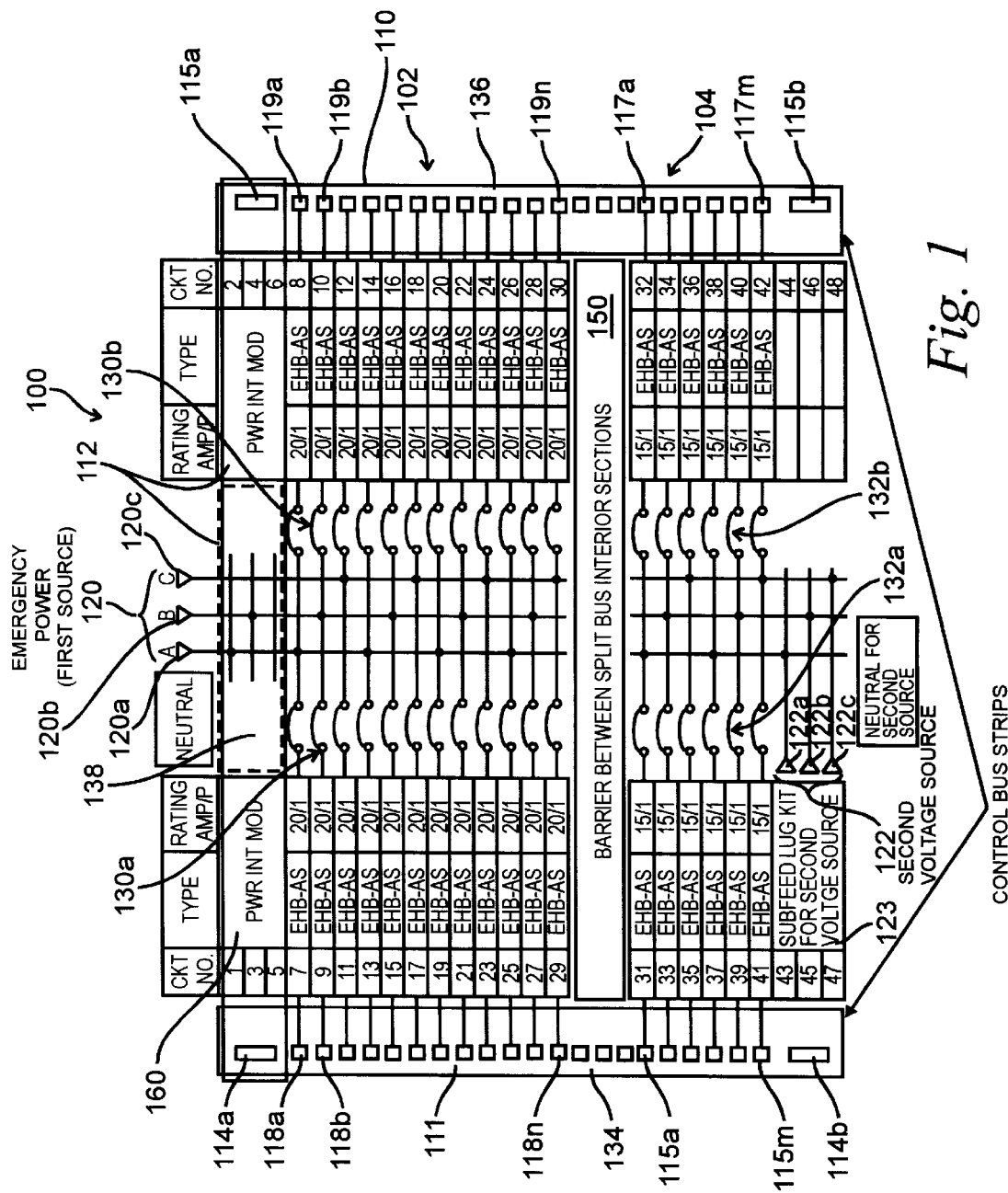
FIG. 1 is a line diagram of a split bus panelboard for use with two voltage sources according to one embodiment of the present invention.

FIG. 1 is a line diagram of a split bus panelboard 100 of a power distribution control system according to one embodiment of the present invention. The panelboard 100 divides an enclosure into a first internal section (a main section) 102 and a second split section 104. A barrier 150 splits the panelboard 110 into sections 102 and 104. The main section 102 receives power from a first voltage source 120 via main lugs 120a–120c while the second or split section 104 receives power from a separate second voltage source 122 via subfeed lugs 122a–122c. One of the voltage sources is an emergency power source. FIG. 1 shows the main section 102 receiving power from the emergency power source 120. As an example, the split section 104 may be supplied power from a 480Y/277 Vac 3 phase 4 W power source while the inside of the main section 102 may be supplied power from a 208Y/120V 3 phase 4 W emergency generator.

Each of the sides 110 and 111 of the first section 102 respectively includes spaced apart connectors 118a–118n and 119a–119n suitable for connection with individual remotely-operated circuit breakers. The circuit breaker connectors 7–29 on the side 111 and connectors 8–30 on the side 110 are provided for connection with individual remotely-operated circuit breakers for the main section 102. Similarly, connectors 31–41 and 32–42 respectively provide connections for the circuit breakers for sides 111 and 110 of the split section 104. Power for the loads coupled to individual circuit breakers in the first section 102 is supplied from a first power source 120 through lugs 120a–120c and lines 130a and 130b. Power for loads coupled to the split section 104 circuit breakers is supplied from the second power source 122 via separate lines 132a and 132b.

In the embodiment of the present invention shown in FIG. 1, one set of electronics is utilized to control all of the circuit breakers 118a–118n, 119a–119n, 115a–115m and 117a–117m in both sections 102 and 104. In the present invention, a control bus strip 134 bridges the main section 102 and the split section 104 to operate the circuit breakers on side 111 from either voltage source (120 and 122). Similarly, a control bus strip 136 bridges the main and split sections 102 and 104 to operate the circuit breakers 117a–117m and 119a–119n on side 110 from either of the voltage sources 120 and 122. Separate neutrals 138 and 139 are mounted on opposite ends of the panelboard 100 for sections 102 and 104 respectively.

Figure 2:
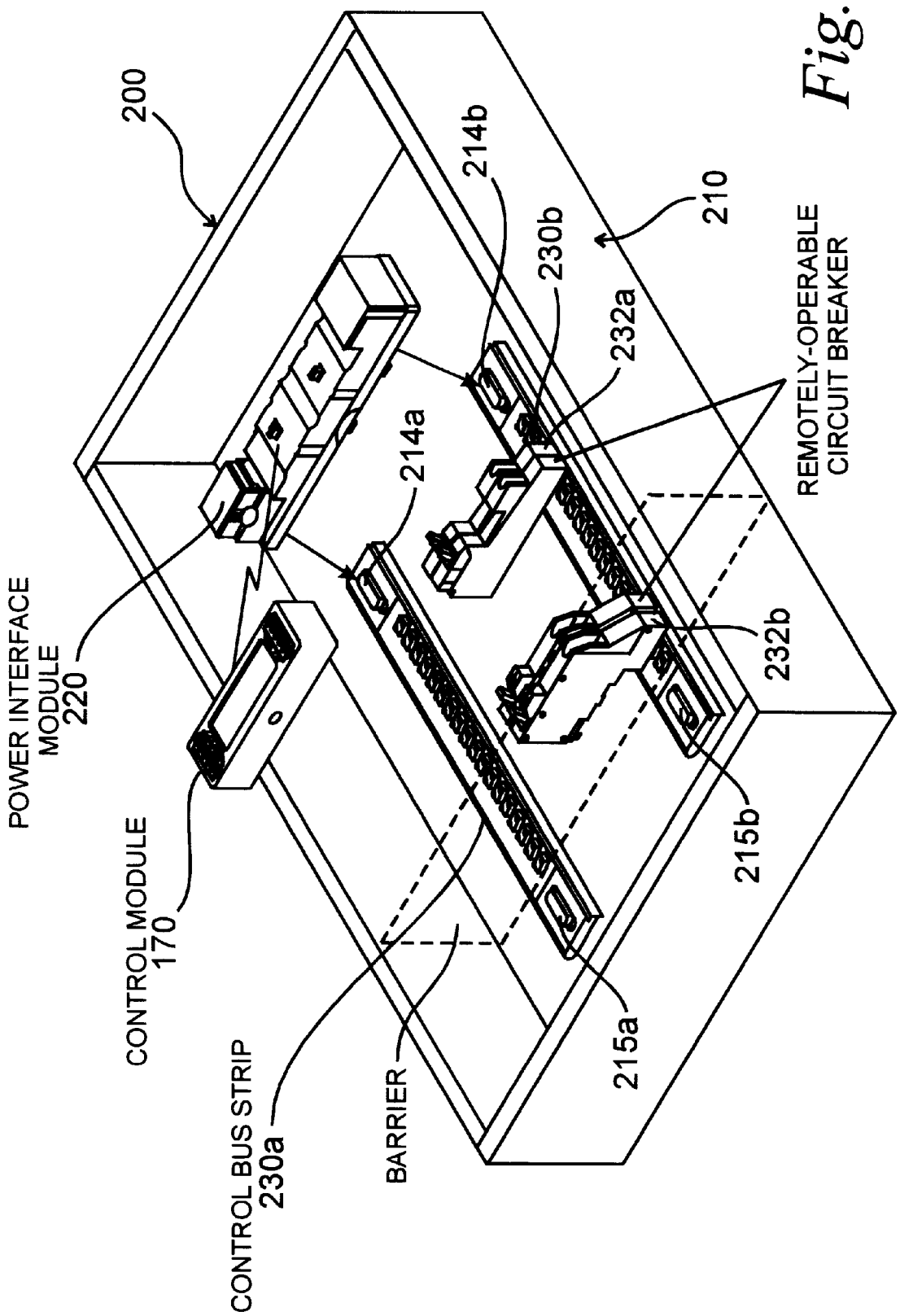
FIG. 2 is an isometric view of a portion of the split bus panelboard of FIG. 1 according to one embodiment of the present invention.

A common power interface module 160 converts incoming power 120 to a first d.c. voltage (24 volts in the present embodiment) for use by the motor of the individual circuit breakers and a second low d.c. voltage (5 volts in the present embodiment) for operating the electronic circuits of a control unit 170 (see FIG. 2). The common control unit 170 utilizing the second low voltage (5 volts in the present embodiment) controls the operation of each of the circuit breakers via buses 134 and 136. The control unit 170 provides signals to the individual circuit breakers via connectors 114a, 114b, 115a and 115b. In the present invention, the power interface unit 160 derives power from the emergency voltage source 120, thus continuously providing power to the control unit 170 and the circuit breaker motors even if there is a power outage of the second voltage source 122. The common control bus strips 134 and 136 allow the control unit 170 to operate the circuit breakers in both sections 102 and 104.

FIG. 2 shows an isometric view of a power distribution system 200, which has an enclosure 210 for housing the various components thereof. The power interface module 220 attaches to the phase bus of the first voltage source 120 and provides the +5 vdc for the control module 170 and the 24 vdc for the circuit breaker motors. The control buses 230a and 230b serve as interconnect wiring between the power interface module 220 and the remotely-operated circuit breakers, such as breakers 232a and 232b via connectors 214a–214b and 215a–215b. The control bus strips 230a and 230b provide means for supplying the 24 vdc to the circuit breaker motors and means for providing communication link between the control unit 170 and the circuit breakers 232a and 232b. The control unit 170 may be a microprocessor-based unit that includes memory devices and electronic circuitry. The control unit 170 is adapted to turn on and turn off individual circuit breakers 232a, 232b etc. according to instructions stored in the control unit and/or communicated to the control unit from a remote unit, such as a computer (not shown). The control unit also provides the status of each circuit breaker and is adapted for two-way communication with the remote unit and each of the circuit breakers. Each circuit breaker preferably has its internal electronic circuits for remote operation. Any suitable control unit and remotely-operated circuit breakers may be utilized in the system 200. Such control units and circuit breakers are commercially known and their detailed circuit and functions are thus not described herein.

Thus, the present invention provides a power distribution control system which enables termination of at least two separate voltage sources in the same panelboard enclosure, each voltage source supplying power to a separate section of the interior of the panelboard enclosure. The system utilizes a single set of electronics (such as control unit and power interface unit) to control circuit breakers in the two sections of the split bus interior. Bus strips bridge between the two split sections to operate the circuit breakers from either voltage source.

In the event of a power outage, the above-described power distribution system can control all circuit breakers in a split bus panelboard by utilizing the emergency power source. The control electronic is mounted in the emergency power section of the interior of the enclosure. Thus always providing logic signals and power to operate the circuit breakers. A common set of electronics in the panelboard controls all of the circuit breakers via a common bus strip that bridges between two split sections to operate the circuit breakers from either voltage source.

The power distribution system 200 of the present invention may be utilized for any dual voltage source application. It is particularly useful for emergency power applications. It is particularly useful for controlling lighting applications in commercial establishments such as public buildings, office buildings, convention centers and arenas which usually have emergency power systems. The system 200 reduces the two panelboard installation to a single installation, minimizes the use of the mounting wall space, reduces the electronic circuitry and the overall cost compared to separate systems for each power source.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A power distribution unit, comprising:
   (a) a panelboard having a first and second interior sections;
   (b) a first power source supplying electric power to said first section and a second separate power source supplying power to said second section;
   (c) a first plurality of remotely-operated circuit breakers in said first section and a second plurality of remotely-operated circuit breakers in said second section;
   (d) a control bus electrically coupled to said first and second plurality of said circuit breakers to provide electrical power and control signals to said each circuit breaker; and
   (e) a control unit receiving power from one of said first and second power sources and controlling the operation of each said circuit breakers in said first and second plurality of circuit breakers through the control bus.

2. The power distribution unit according to claim 1 further comprising a barrier separating the first and second interior sections.

3. The power distribution unit according to claim 1 further comprising a separate connector on the control bus for each circuit breaker in said first and second pluralities of circuit breakers.

4. A method of distributing power to loads through remotely-operated circuit breakers, comprising:

providing a panelboard having a first and second interior sections;

providing electric power to said first interior section from a first power source and to said second interior section from a second power source different from the first power source;

providing a power interface unit for converting said electric power to a first voltage and a second voltage;

providing a first plurality of remotely-operated circuit breakers in said first interior section and a second plurality of remotely-operated circuit breakers in said second interior section;

connecting a common control bus to said first plurality of remotely-operated circuit breakers and said second plurality of remotely-operated circuit breakers to provide said first voltage and said second voltage to each circuit breaker in said first plurality of remotely-operated circuit breakers and said second plurality of remotely-operated circuit breakers; and providing a control unit, said control unit receiving one of said low voltages and controlling the operation of each said circuit breaker in said first plurality of remotely-operated circuit breakers and said second plurality of remotely-operated circuit breakers through the control bus.

5. The method according to claim 4 further comprising providing a barrier between said first interior section and said second interior section.

6. The method of claim 4 wherein said electric power to said interface unit is emergency power.

7. The method of claim 4 further comprising providing two-way communication between said control unit and a remote unit.

8. The method of claim 7 wherein said providing two-way communication comprises providing the status of each said circuit breaker in said first plurality of remotely-operated circuit breakers and said second plurality of remotely-operated circuit breakers from said control unit to said remote unit.

9. The method of claim 8 wherein said remote unit comprises a computer.

10. The power distribution unit according to claim 1 further comprising a common power interface unit providing a first d.c. voltage to said first plurality of remotely-operated circuit breakers and said second plurality of remotely-operated circuit breakers.

11. The power distribution unit according to claim 10 wherein said power interface unit further provides a second low d.c. voltage to said control unit.

12. The power distribution unit according to claim 10, wherein said first d.c. voltage is 24 volts.

13. The power distribution unit according to claim 11, wherein said second low d.c. voltage is 5 volts.

14. A power distribution unit, comprising:

(a) a panelboard having a first interior section and a second interior section;

(b) a first power source providing power to said first interior section of said panelboard;

(c) a second power source providing power to said second interior section of said panelboard;

(d) a first plurality of remotely-operated circuit breakers in said first interior section;

(e) a second plurality of remotely-operated circuit breakers in said second interior section;

(f) a bus electrically coupled to said first plurality of remotely-operated circuit breakers and said second plurality of remotely-operated circuit breakers;

(g) a power interface unit converting electric power from said first power source to a first voltage and a second voltage; and (h) a control unit receiving said second voltage and controlling the operation of each of said first plurality of remotely-operated circuit breakers and said second plurality of remotely-operated circuit breakers through said bus.

15. The power distribution unit according to claim 14, wherein said control unit is a microprocessor-based unit with a plurality of memory devices.

16. The power distribution unit according to claim 14, wherein said first power source is an emergency generator.

17. The power distribution unit according to claim 14, wherein said first voltage is 24 volts.

18. The power distribution unit according to claim 14, wherein said second voltage is 5 volts.

19. The power distribution unit according to claim 13 wherein said power interface unit derives power from an emergency power source.

* * * * *